(12) United States Patent
Jung et al.

(10) Patent No.: US 9,762,780 B2
(45) Date of Patent: Sep. 12, 2017

(54) DISPLAY DEVICE INCLUDING CAMERA MODULE

(71) Applicant: LG ELECTRONICS INC., Seoul (KR)

(72) Inventors: Jintaek Jung, Seoul (KR); Junghyun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/913,806

(22) PCT Filed: Sep. 10, 2013

(86) PCT No.: PCT/KR2013/008148
§ 371 (c)(1),
(2) Date: Feb. 23, 2016

(87) PCT Pub. No.: WO2015/034120
PCT Pub. Date: Mar. 12, 2015

(65) Prior Publication Data
US 2016/0205293 A1    Jul. 14, 2016

(30) Foreign Application Priority Data
Sep. 9, 2013  (KR) .......................... 10-2013-0108091

(51) Int. Cl.
*H04N 5/225*  (2006.01)
(52) U.S. Cl.
CPC ......... *H04N 5/2252* (2013.01); *H04N 5/2257* (2013.01)

(58) Field of Classification Search
CPC .................................................. H04N 5/2252
See application file for complete search history.

(56) References Cited

U.S. PATENT DOCUMENTS

| | | | | |
|---|---|---|---|---|
| 5,801,919 A | * | 9/1998 | Griencewic | G06F 1/1686 348/552 |
| 6,812,958 B1 | * | 11/2004 | Silvester | G06F 1/1607 348/207.1 |
| 7,435,018 B2 | * | 10/2008 | Huang | G03B 17/04 348/373 |
| 7,800,648 B2 | * | 9/2010 | Lu | H04N 5/2252 348/207.1 |

(Continued)

FOREIGN PATENT DOCUMENTS

| KR | 10-2005-0092202 A | 9/2005 |
|---|---|---|
| KR | 10-2010-0064552 A | 6/2010 |
| KR | 10-2013-0078301 A | 7/2013 |

OTHER PUBLICATIONS

International Search Report dated May 29, 2014 issued in Application No. PCT/KR2013/008148 (with English translation).

*Primary Examiner* — Gary C Vieaux
(74) *Attorney, Agent, or Firm* — KED & Associates, LLP

(57) ABSTRACT

A display device including a camera module is disclosed. The display device includes a display panel; a case member disposed on a back surface of the display panel; and a camera module disposed on a back surface of the case member. When a predetermined pressure is applied to an upper part of the camera module, the camera module is configured to rise by a predetermined height and then rotate at a predetermined angle.

14 Claims, 13 Drawing Sheets

(56) References Cited

U.S. PATENT DOCUMENTS

| | | | | |
|---|---|---|---|---|
| 7,847,860 B2* | 12/2010 | Kim | ................. | H04M 1/0218 |
| | | | | 348/375 |
| 8,224,179 B2* | 7/2012 | Lin | ................. | G03B 17/02 |
| | | | | 348/376 |
| 9,332,176 B2* | 5/2016 | Jang | ................. | H04N 5/23222 |
| 2004/0245342 A1* | 12/2004 | Cho | ................. | H04N 5/2254 |
| | | | | 235/472.01 |
| 2007/0253703 A1* | 11/2007 | Tsai | ................. | G03B 17/02 |
| | | | | 396/429 |
| 2007/0279481 A1* | 12/2007 | Chambers | ............. | H04N 5/232 |
| | | | | 348/14.01 |
| 2008/0085112 A1 | 4/2008 | Lane et al. | | |
| 2009/0284605 A1 | 11/2009 | Sung et al. | | |
| 2013/0163170 A1* | 6/2013 | Chen | ................. | G03B 29/00 |
| | | | | 361/679.4 |

\* cited by examiner

DISPLAY DEVICE INCLUDING CAMERA MODULE

CROSS-REFERENCE TO RELATED PATENT APPLICATIONS

This application is a U.S. National Stage application under 35 U.S.C. §371 of PCT Application No. PCT/KR2013/008148, filed Sep. 10, 2013, which claims priority to Korean Patent Application No. 10-2013-0108091, filed Sep. 9, 2013, whose entire disclosures are hereby incorporated by reference.

TECHNICAL FIELD

The present disclosure relates to a display device including a camera module.

BACKGROUND ART

As information society develops, a demand for a display device displaying an image is increasing in various manners. Hence, various flat panel displays (FPDs), which may replace cathode ray tubes (CRTs) disadvantageous to the weight and the volume, have been recently developed and have been put on the market. Examples of the flat panel displays include a liquid crystal display (LCD), an organic light emitting diode (OLED) display, and a field emission display (FED).

A camera module including a camera may be mounted on the flat panel display. Hence, the camera module may take an image positioned in front of the flat panel display, and the flat panel display may perform various operations using the image taken with camera module.

FIG. 1 illustrates a side of a display device including a related art camera module. Referring to FIG. 1, a camera module CD is mounted on a back surface of a display device DIS. However, as shown in FIG. 1, when a protruding height H of the camera module CD decreases due to a thickness D of the display device DIS, there occurs a problem, in which a portion of the display device DIS is taken by a camera C. In FIG. 1, "θ" denotes an angle of view of the camera C. Thus, as shown in FIG. 1, the protruding height H of the camera module CD has to increase in proportion to the thickness D of the display device DIS, so as to prevent the above problem. In particular, a thickness of an ultra-high-definition (UHD) display device, which have been recently released, is greater than a thickness of a full-high-definition (FHD) display device due to an increase in light emitting diodes (LEDs). Further, when the protruding height H of the camera module CD measured from the display device DIS excessively increases, an appearance of the display device DIS is deteriorated.

SUMMARY OF INVENTION

Technical Problem

The present disclosure provides a display device capable of solving a problem, in which a portion of the display device is taken by a camera, without increasing a protruding height of a camera module.

Technical Solution

In one aspect, there is a display device comprising a display panel; a case member disposed on a back surface of the display panel; and a camera module disposed on a back surface of the case member, wherein when a predetermined pressure is applied to an upper part of the camera module, the camera module is configured to rise by a predetermined height and then rotate at a predetermined angle.

Advantageous Effects

According to embodiments of the invention, because a camera module vertically rises and also rotates by a predetermined angle when the camera module protrudes, a camera protrudes toward a front surface of a display device. Alternatively, the camera module vertically rises when a housing member receiving the camera module protrudes, and also the camera module is frontward inclined by a supporting member when the housing member rises. Therefore, the camera protrudes toward the front surface of the display device. Alternatively, because the camera module rises in a state where the camera module is frontward inclined at a predetermined angle, the camera protrudes toward the front surface of the display device. As a result, the embodiments of the invention can be implemented, so that the display device is not included in an angle of view of the camera without increasing a protruding height of the camera module. Thus, the embodiments of the invention can solve a problem, in which a portion of the display device is taken by the camera, without increasing the protruding height of the camera module.

MODE FOR INVENTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. Names of components used in the following description may be selected in consideration of facility of specification preparation. Thus, the names of the components may be different from names of components used in a real product.

Figure 1:
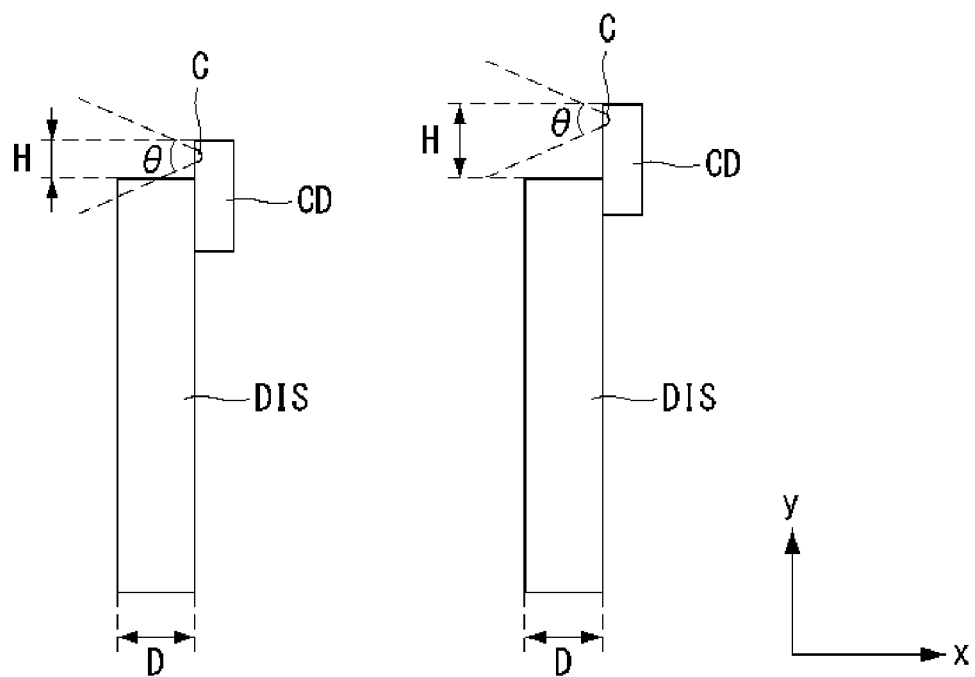
FIG. 1 illustrates a side of a display device including a related art camera module.
Figure 2A:
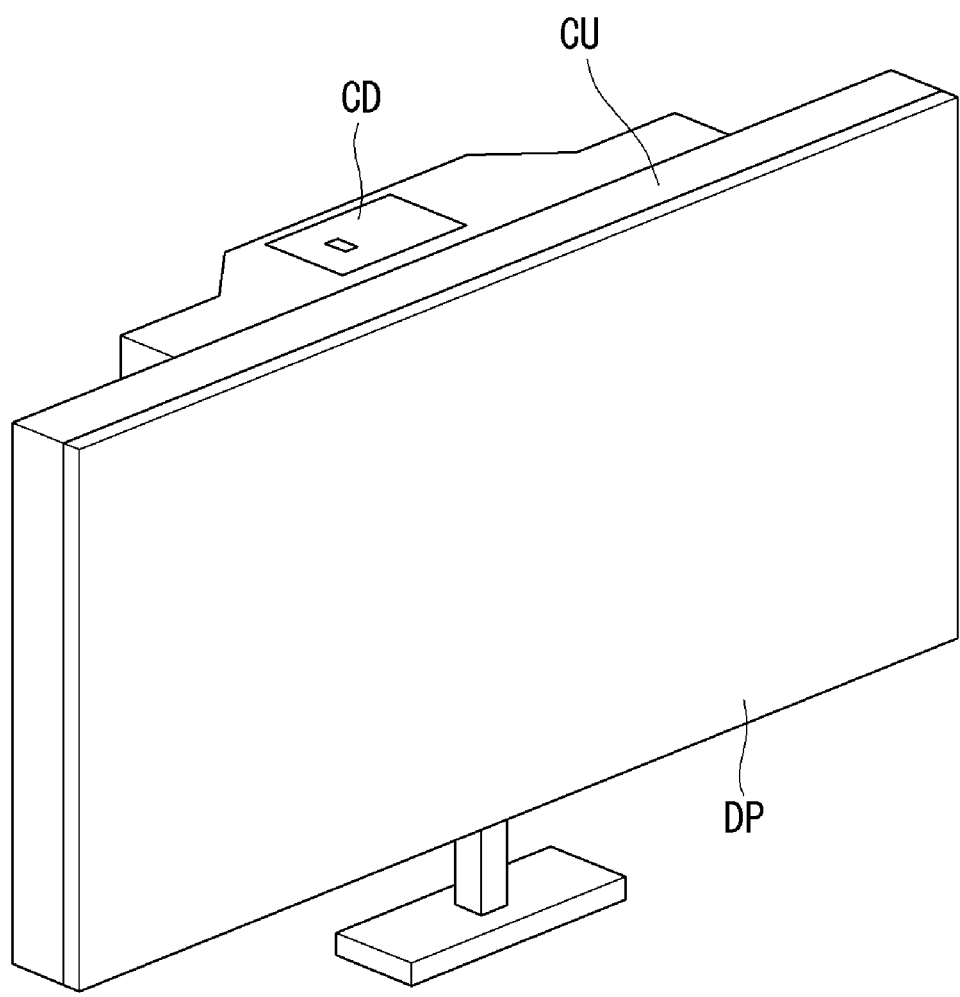
FIGS. 2a to 2c illustrate a camera module of a display device according to a first embodiment of the invention.
Figure 2B:
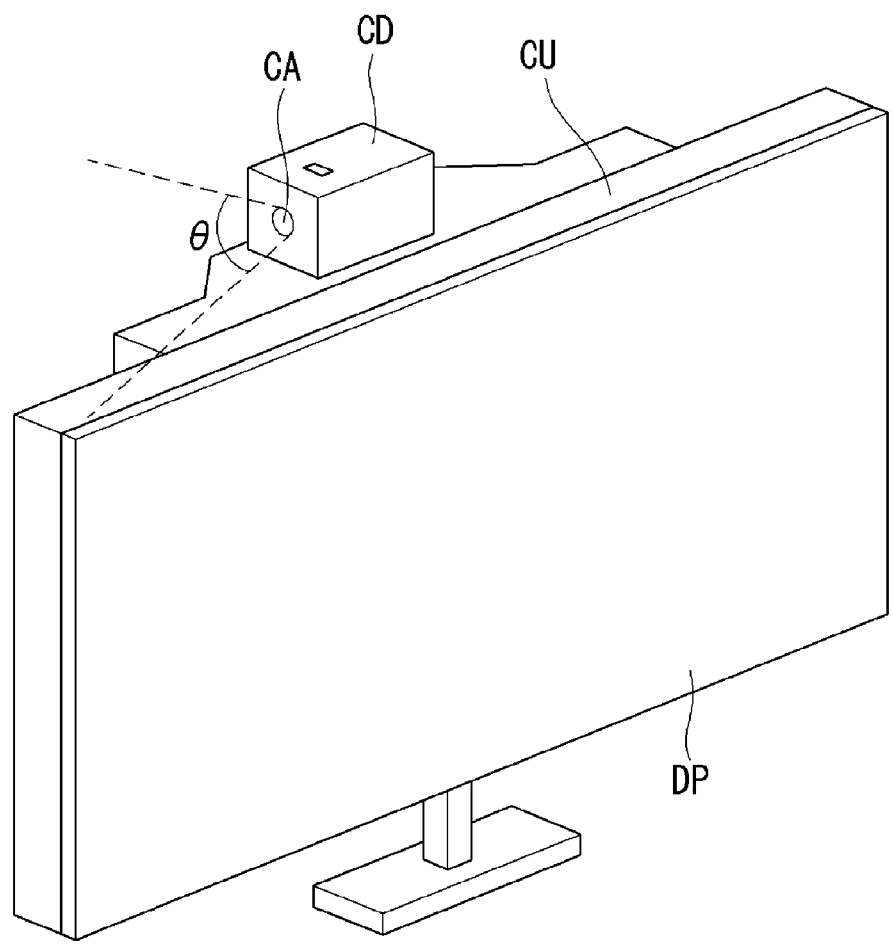
Figure 2C:
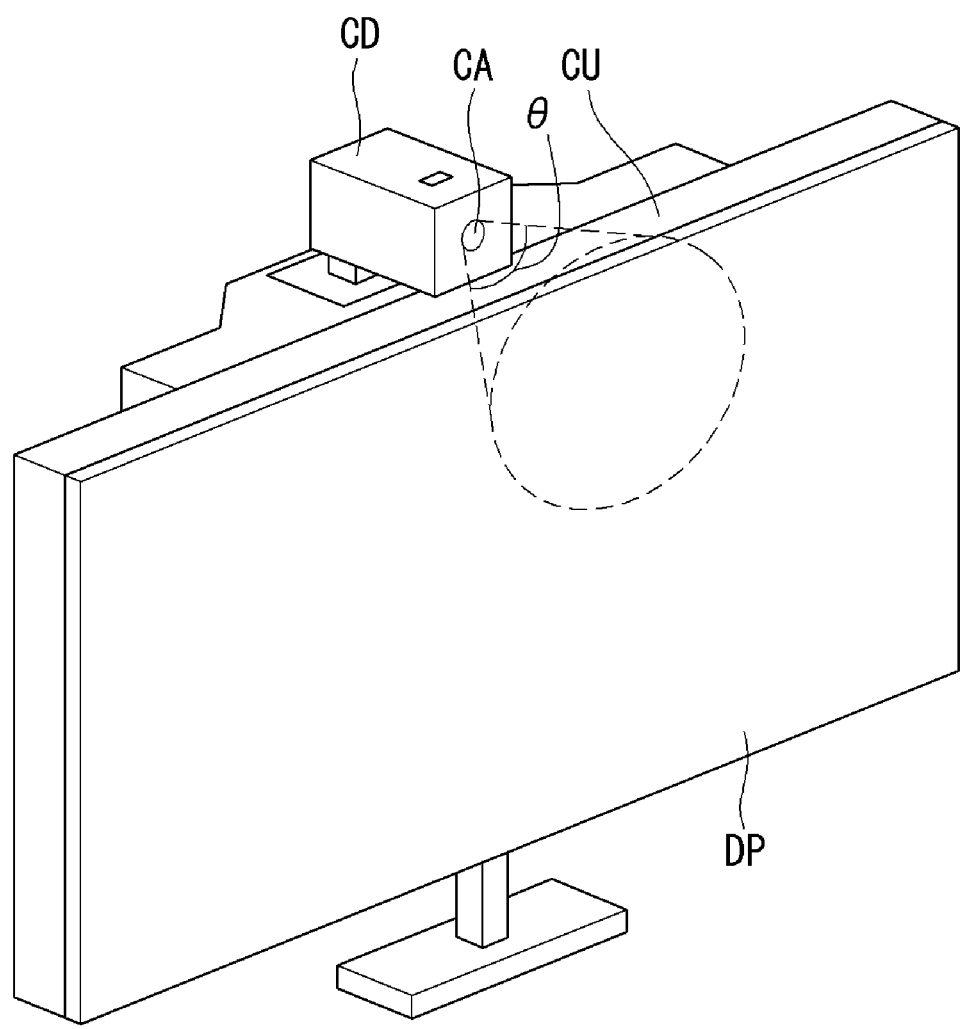

FIGS. 2a to 2c illustrate a camera module of a display device according to a first embodiment of the invention. Referring to FIGS. 2a to 2c, the display device according to the first embodiment of the invention includes a display panel DP, a case member CU, a camera module CD, and a driving member for driving the camera module CD.

The display panel DP displays an image. The display panel DP may be implemented as a flat panel display panel, such as a liquid crystal display (LCD) panel, a field emission display (FED) panel, a plasma display panel (PDP), and an organic light emitting diode (OLED) display panel.

The case member CU is formed to surround a front edge, an upper surface, a lower surface, a left side, a right side, and a back surface of the display panel DP, so as to protect the display panel DP from an external impact.

The camera module CD includes a camera CA for taking an image. The camera module CD has to be disposed on the back surface of the display panel DP considering a structure of the display device. Therefore, as shown in FIGS. 2a to 2c, the camera module CD is disposed on the back surface of the display device.

The camera module CD received on the back surface of the display device protrudes by a user's pressure. More specifically, as shown in FIG. 2a, the camera module CD may be received in the display device. As shown in FIG. 2a, the camera module CD is received so that the camera CA faces toward the side of the display device. When the user presses an upper part of the camera module CD while applying a predetermined pressure to it, the camera module CD may rise in a vertical direction (y-axis direction) and protrude as shown in FIG. 2b. As shown in FIG. 2c, after the camera module CD protrudes at a predetermined height, the camera module CD rotates at a predetermined angle and rises, so that the camera CA faces toward the front of the display device. FIG. 2c shows that the camera module CD rotates at about 90° and rises, as an example.

The protruding camera module CD may be received on the back surface of the display device by the user's pressure. A process for receiving the camera module CD is performed in reverse order of the above-described process for protruding the camera module CD. More specifically, when the user presses the upper part of the protruding camera module CD while applying a predetermined pressure to it, the camera module CD rotates at a predetermined angle and falls as shown in FIG. 2b. When the user continuously presses the upper part of the protruding camera module CD while applying a predetermined pressure to it, the camera module CD falls in the vertical direction (y-axis direction) and is received on the back surface of the display device as shown in FIG. 2a.

As described above, in the first embodiment of the invention, because the camera module CD rises in the vertical direction and also rotates at the predetermined angle, the camera CA protrudes to the front of the display device. As a result, the first embodiment of the invention may be implemented, so that the display device is not included in an angle θ of view of the camera CA without increasing a protruding height of the camera module CD as shown in FIG. 2c. Thus, the first embodiment of the invention can solve a problem, in which a portion of the display device is taken by the camera, without increasing the protruding height of the camera module.

A driving member for driving the camera module CD according to the first embodiment of the invention is described in detail below with reference to FIGS. 3 and 4a to 4c.

Figure 3:
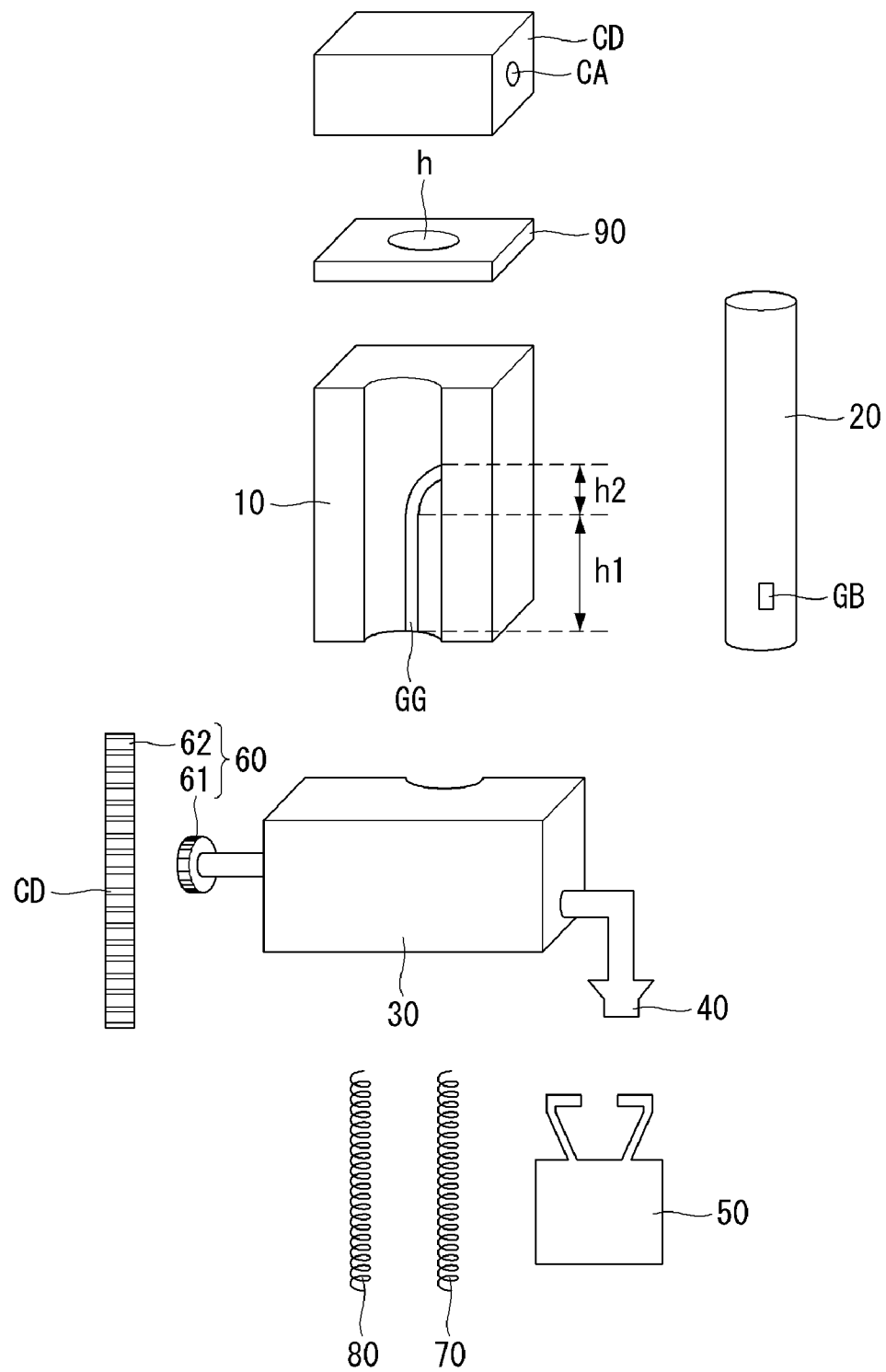
FIG. 3 is an exploded perspective view showing in detail a camera module and a camera driver according to a first embodiment of the invention.
Figure 4A:
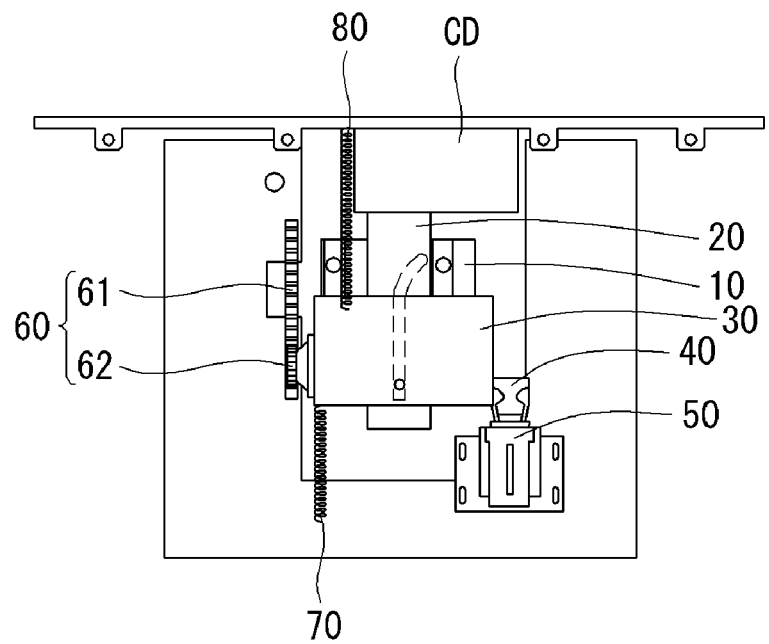
FIGS. 4a to 4c illustrate a camera driver in accordance with a protrusion of a camera module.
Figure 4B:
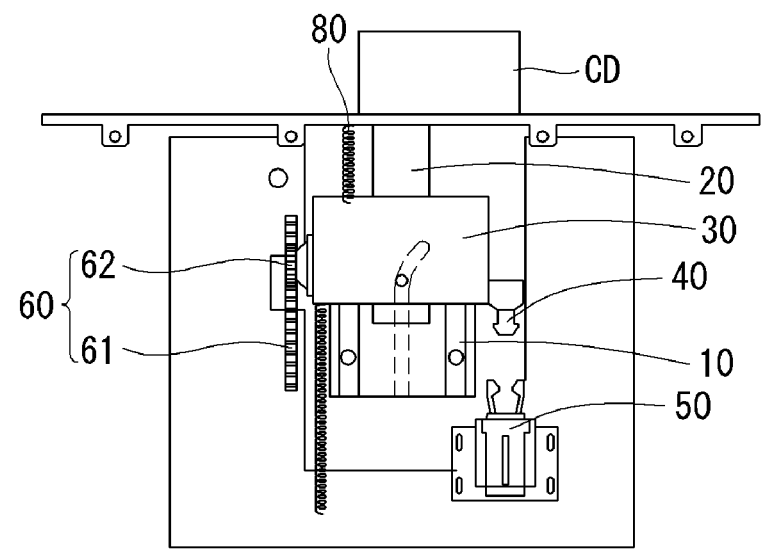
Figure 4C:
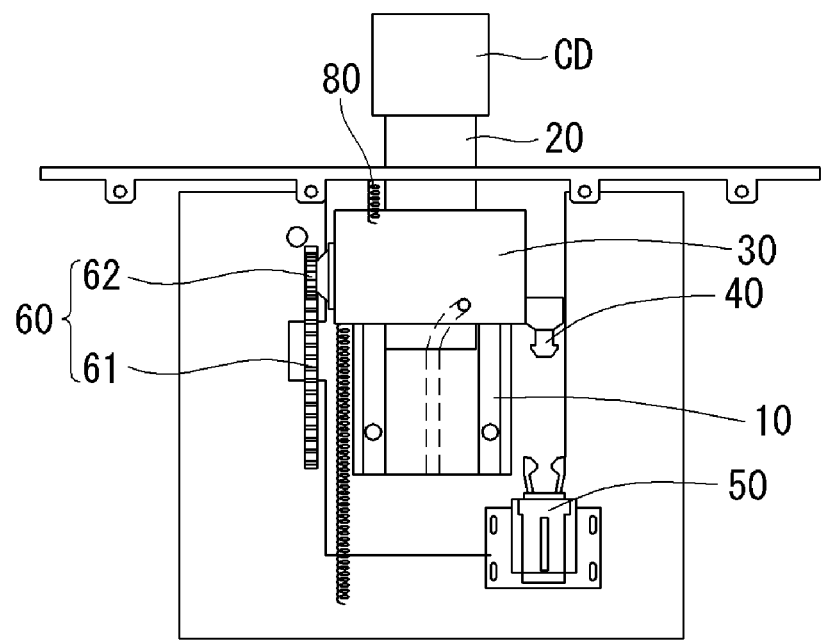

FIG. 3 is an exploded perspective view showing in detail the camera module and the driving member according to the first embodiment of the invention. FIGS. 4a to 4c illustrate the driving member in accordance with a protrusion of the camera module. More specifically, FIG. 4a illustrates a state of the driving member when the camera module CD is received in the display device as shown in FIG. 2a. FIG. 4b illustrates a state of the driving member when the camera module CD rises in the vertical direction (y-axis direction) and protrudes as shown in FIG. 2b. FIG. 4c illustrates a state of the driving member when the camera module CD rotates at the predetermined angle and rises as shown in FIG. 2c.

Referring to FIGS. 3 and 4a to 4c, the driving member according to the first embodiment of the invention includes a guide member 10, a cylindrical body 20, a moving member 30, first and second fixing members 40 and 50, a gear device 60, first and second elastic members 70 and 80, a hole cover 90, and the like.

The guide member 10 guides a movement of the cylindrical body 20. For this, the guide member 10 includes a guide groove GG, and a guide projection GB of the cylindrical body 20 is inserted into the guide groove GG. Further, an area of the guide member 10 contacting an outer circumference surface of the cylindrical body 20 is formed in the same manner as the outer circumference surface of the cylindrical body 20. Hence, the cylindrical body 20 moves along the guide groove GG. The guide groove GG is configured such that the guide groove GG from a lower end of the guide member 10 to a first height h1 is formed along the vertical direction (y-axis direction), and the guide groove GG from the first height h1 to a second height h2 is formed slantingly to the vertical direction (y-axis direction). Thus, the cylindrical body 20 moves from the lower end of the guide member 10 to the first height h1 in the vertical direction and rotates from the first height h1 to the second height h2 along the guide groove GG. In particular, because the cylindrical body 20 is coupled with a lower part of the camera module CD, the camera module CD rises in the vertical direction (y-axis direction) and then rotates by a predetermined angle.

The moving member 30 is coupled with the cylindrical body 20 and moves the cylindrical body 20. An area of the moving member 30 contacting the outer circumference surface of the cylindrical body 20 is formed in the same manner as the outer circumference surface of the cylindrical body 20.

The first fixing member 40 and a rack 61 are formed at the moving member 30. As shown in FIG. 3, the first fixing member 40 is formed on one side of the moving member 30 and is fastened to the second fixing member 50, thereby fixing the moving member 30. As shown in FIG. 3, the rack 61 is formed on the other side of the moving member 30 and is geared to a pinion 62. As shown in FIG. 3, the gear device 60 may be implemented by the rack 61 and the pinion 62 through the gear. The moving member 30 may be movably implemented in the vertical direction (y-axis direction) by the pinion 62.

Further, the moving member 30 is coupled with the first and second elastic members 70 and 80. The first elastic member 70 provides an elastic force in a first direction. The first direction may be a vertically upward direction rising in the vertical direction. The moving member 30 moves in the first direction by the elastic force of the first elastic member 70. The second elastic member 80 provides an elastic force in a second direction which is the opposite direction of the first direction. The second direction may be a vertically downward direction falling in the vertical direction. The second elastic member 80 prevents a sharp rise of the moving member 30 resulting from the elastic force of the first elastic member 70. Thus, the elastic force of the second elastic member 80 has to be smaller than the elastic force of the first elastic member 70.

The second fixing member 50 is fastened to the first fixing member 40 and fixes the moving member 30. Further, when a predetermined pressure is applied to the second fixing member 50 in the vertically downward direction, i.e., the second direction, the fastening between the first fixing member 40 and the second fixing member 50 is released.

The hole cover 90 between the camera module CD and the guide member 10 is coupled with the cylindrical body 20. For this, the hole cover 90 has a predetermined hole h, and the cylindrical body 20 is inserted into the predetermined hole h. The hole cover 90 rises and falls as the cylindrical body 20 moves. The hole cover 90 covers a hole generated by the rise of the camera module CD.

Hereinafter, an operation of the driving member in accordance with the protrusion of the camera module CD is sequentially described with reference to FIGS. 4a to 4c.

Firstly, as shown in FIG. 4a, as the first fixing member 40 is fastened to the second fixing member 50, the moving member 30 is fixed. Because the cylindrical body 20 coupled with the moving member 30 is fixed due to the fixing of the moving member 30, the camera module CD does not protrude as shown in FIG. 4a and maintains a state where the camera module CD is received in the display device.

Secondly, as shown in FIG. 4b, when the user applies a predetermined pressure to the upper part of the camera module CD, the fastening between the first fixing member 40 and the second fixing member 50 is released by the predetermined pressure. When the fastening between the first fixing member 40 and the second fixing member 50 is released, the moving member 30 rises in the vertically upward direction, i.e., the first direction by the elastic force of the first elastic member 70. The cylindrical body 20 coupled with the moving member 30 also rises due to the rise of the moving member 30. The cylindrical body 20 vertically rises along the guide groove GG of the guide member 10 formed in the vertical direction (y-axis direction). Hence, the camera module CD coupled with the cylindrical body 20 vertically rises as shown in FIG. 4b.

Thirdly, as shown in FIG. 4c, the moving member 30 continuously rises in the vertically upward direction, i.e., the first direction by the elastic force of the first elastic member 70, and also the cylindrical body 20 coupled with the moving member 30 rises. The cylindrical body 20 rotates by a predetermined angle along the guide groove GG of the guide member 10 formed slantingly to the vertical direction (y-axis direction) and rises. Hence, the camera module CD coupled with the cylindrical body 20 rotates by a predetermined angle and rises as shown in FIG. 4c.

Further, an operation of the driving member in accordance with the fall of the camera module CD is performed in reverse order of the above-described operation of the driving member in accordance with the rise of the camera module CD.

Firstly, when the user presses the upper part of the camera module CD while applying a predetermined pressure to it, the moving member 30 falls in the vertically downward direction, i.e., the second direction by the predetermined pressure. Hence, the cylindrical body 20 coupled with the moving member 30 also falls. The cylindrical body 20 rotates by a predetermined angle along the guide groove GG of the guide member 10 formed slantingly to the vertical direction (y-axis direction) and falls. Hence, as shown in FIGS. 4b and 4c, the camera module CD coupled with the cylindrical body 20 rotates by a predetermined angle and falls.

Secondly, when the user continuously presses the upper part of the camera module CD while applying a predetermined pressure to it, the moving member 30 falls in the vertically downward direction, i.e., the second direction, and also the cylindrical body 20 coupled with the moving member 30 also falls. The cylindrical body 20 vertically falls along the guide groove GG of the guide member 10 formed in the vertical direction (y-axis direction). Hence, as shown in FIGS. 4a and 4b, the camera module CD coupled with the cylindrical body 20 vertically falls.

Thirdly, when the user continuously presses the upper part of the camera module CD while applying a predetermined pressure to it, the first fixing member 40 is fastened to the second fixing member 50. Hence, the moving member 30 is fixed. Because the cylindrical body 20 coupled with the moving member 30 is fixed due to the fixing of the moving member 30, the camera module CD is received in the display device as shown in FIG. 4a.

As described above, according to the first embodiment of the invention, because the camera module CD vertically rises and also rotates by the predetermined angle, the camera CA protrudes toward the front surface of the display device. As a result, the first embodiment of the invention may be implemented, so that the display device is not included in the angle θ of view of the camera CA without increasing the protruding height of the camera module CD as shown in FIGS. 2c and 4c. Thus, the first embodiment of the invention can solve the problem, in which a portion of the display device is taken by the camera, without increasing the protruding height of the camera module.

Figure 5A:
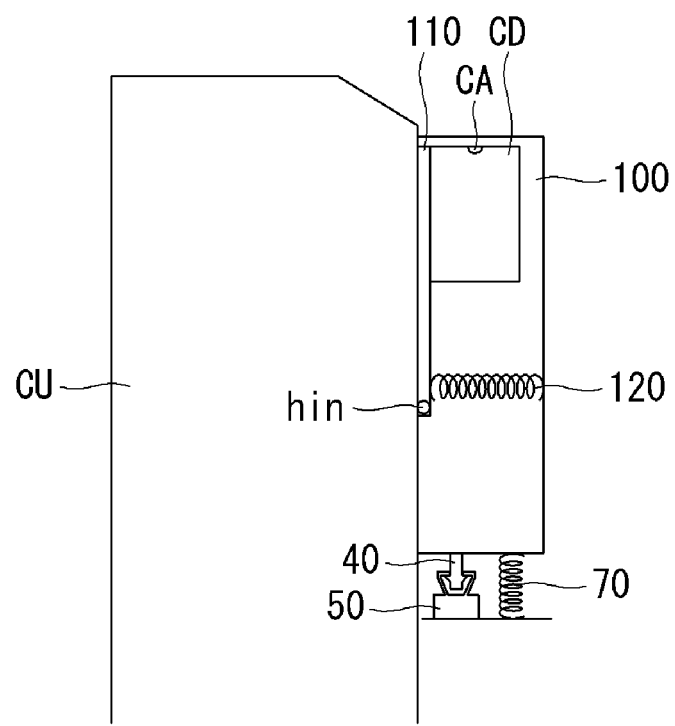
FIGS. 5a to 5c illustrate a camera module of a display device according to a second embodiment of the invention.
Figure 5B:
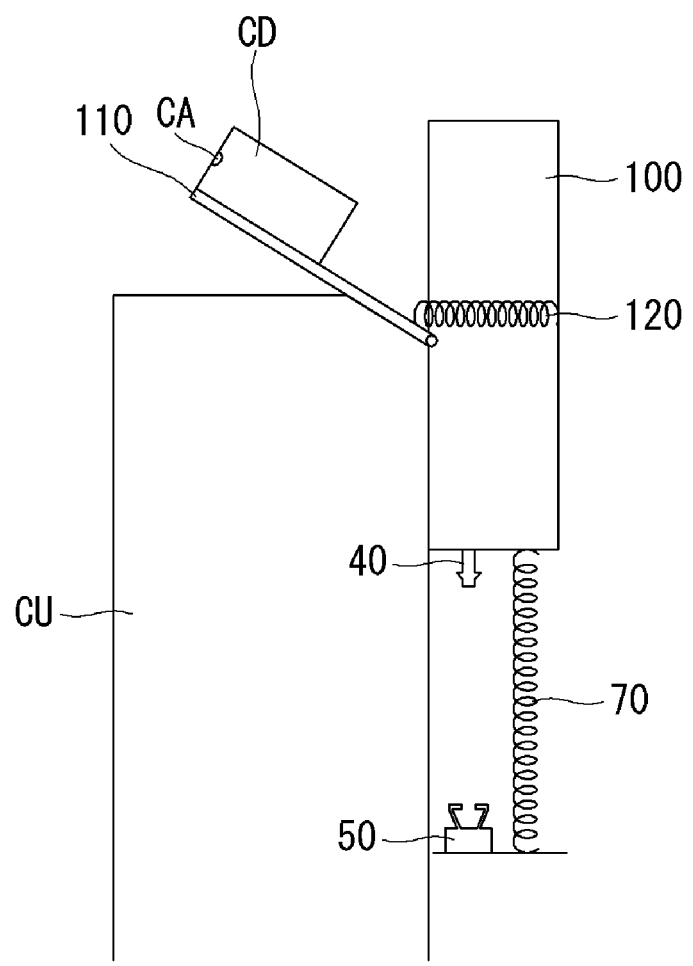
Figure 5C:
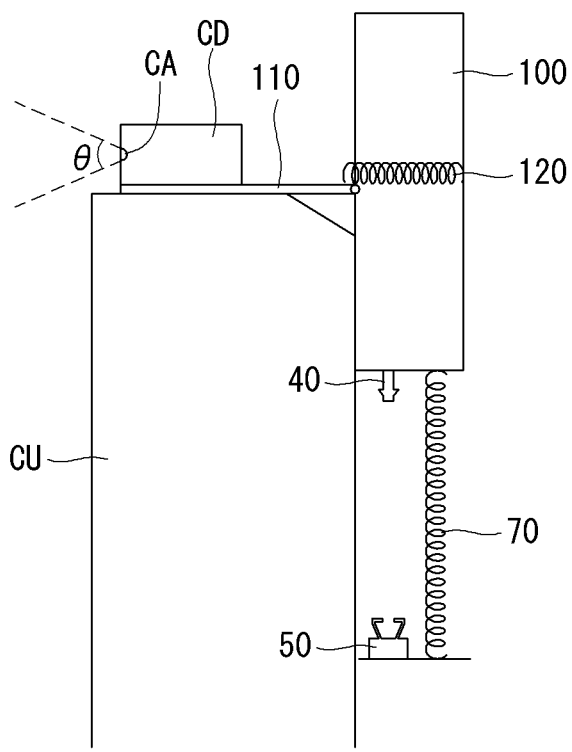
Figure 6A:
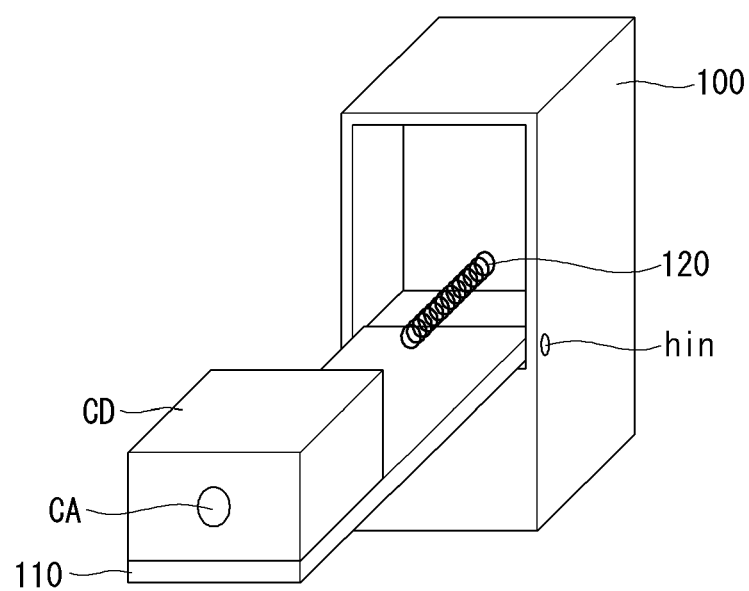
FIGS. 6a and 6b are perspective views showing in detail a camera module, a housing member, and a supporting member.
Figure 6B:
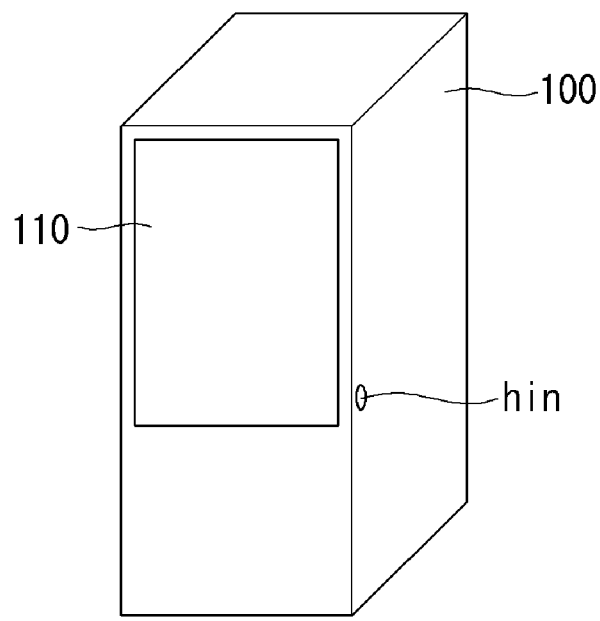

FIGS. 5a to 5c illustrate a camera module of a display device according to a second embodiment of the invention, and FIGS. 6a and 6b are perspective views showing in detail a camera module, a housing member, and a supporting member. More specifically, FIG. 5a is a side view showing an example where a housing member 100 receiving a camera module CD is received in the display device, and FIGS. 5b and 5c are side views showing a state of the camera module CD when the housing member 100 rises in a vertical direction (y-axis direction) and protrudes. In FIG. 5a, the camera module CD, a supporting member 110, and a third elastic member 120 are covered by the housing member 100. Further, FIG. 6a is a perspective view showing an example where the camera module CD is received in the housing member 100, and FIG. 6b is a perspective view showing an example where the camera module CD protrudes toward a front surface of the housing member 100.

Referring to FIGS. 5a to 5c and FIGS. 6a and 6b, the display device according to the second embodiment of the invention includes a display panel (not shown), a case member CU, the camera module CD, and a driving member for driving the camera module CD.

The display panel (not shown) displays an image. The display panel 10 may be implemented as a flat panel display panel, such as a liquid crystal display (LCD) panel, a field emission display (FED) panel, a plasma display panel (PDP), and an organic light emitting diode (OLED) display panel.

The case member CU is formed to surround a front edge, an upper surface, a lower surface, a left side, a right side, and a back surface of the display panel (not shown), so as to protect the display panel (not shown) from an external impact.

The camera module CD includes a camera CA for taking an image. The camera module CD has to be disposed on the back surface of the display panel (not shown) considering a structure of the display device. Therefore, as shown in FIGS. 5a to 5c, the camera module CD is disposed on a back surface of the display device.

The driving member includes the housing member 100, the supporting member 110, first and second fixing members 40 and 50, a first elastic member 70, the third elastic member 120, and the like.

The housing member 100 has enough space to receive the camera module CD, and the camera module CD is received in the housing member 100. The first fixing member 40 and a rack (not shown) may be formed in the housing member 100. As shown in FIGS. 5a to 5c, the first fixing member 40 is formed on a lower surface of the housing member 100 and is fastened to the second fixing member 50, thereby fixing the housing member 100. The rack (not shown) is formed in the housing member 100 and may be geared to a pinion (not shown). The housing member 100 may be movably implemented in the vertical direction (y-axis direction) by a gear device including the rack (not shown) and the pinion (not shown).

Further, the housing member 100 is coupled with the first elastic member 70 and a second elastic member (not shown). The first elastic member 70 provides an elastic force in a first direction. The first direction may be a vertically upward direction rising in the vertical direction. The housing member 100 moves in the first direction by the elastic force of the first elastic member 70. The second elastic member (not shown) provides an elastic force in a second direction which is the opposite direction of the first direction. The second direction may be a vertically downward direction falling in the vertical direction. The second elastic member (not shown) prevents a sharp rise of the housing member 100 resulting from the elastic force of the first elastic member 70. Thus, the elastic force of the second elastic member (not shown) has to be smaller than the elastic force of the first elastic member 70.

The second fixing member 50 is fastened to the first fixing member 40 and fixes the housing member 100. Further, when a predetermined pressure is applied to the second fixing member 50 in the vertically downward direction, i.e., the second direction, the fastening between the first fixing member 40 and the second fixing member 50 is released.

The supporting member 110 is attached to a lower part of the camera module CD and supports the camera module CD. A portion of the supporting member 110 adjoining the back surface of the display device is connected to the housing member 100 through a hinge hin. The third elastic member 120 is coupled with the housing member 100 and provides an elastic force for the supporting member 110 in the vertical direction (y-axis direction). The supporting member 110 is connected to the housing member 100 through the hinge hin and receives the elastic force provided by the third elastic member 120. Therefore, as shown in FIG. 5a, the supporting member 110 is received in the housing member 100. As shown in FIG. 5b, the supporting member 110 may be inclined to a front surface of the housing member 100. As shown in FIG. 5c, the supporting member 110 may be inclined horizontally to an upper surface of the display device. Hence, the camera module CD protrudes toward the front surface of the display device. As a result, the second embodiment of the invention may be implemented, so that the display device is not included in an angle $\theta$ of view of the camera CA without increasing a protruding height of the camera module CD as shown in FIG. 5c. Thus, the second embodiment of the invention can solve a problem, in which a portion of the display device is taken by the camera, without increasing the protruding height of the camera module.

Hereinafter, an operation of the camera module CD in accordance with the rise of the housing member 100 is sequentially described with reference to FIGS. 5a to 5c.

Firstly, as shown in FIG. 5a, as the first fixing member 40 is fastened to the second fixing member 50, the housing member 100 is fixed. As shown in FIG. 5a, the camera module CD maintains a state where the camera module CD is received in the housing member 100, due to the fixing of the housing member 100.

Secondly, as shown in FIG. 5b, when the user applies a predetermined pressure to an upper part of the housing member 100, the fastening between the first fixing member 40 and the second fixing member 50 is released by the predetermined pressure. When the fastening between the first fixing member 40 and the second fixing member 50 is released, the housing member 100 rises in the vertically upward direction, i.e., the first direction by the elastic force of the first elastic member 70. When the housing member 100 rises, the supporting member 110 is inclined to the front of the housing member 100 due to the elastic force of the third elastic member 120. Further, as shown in FIGS. 5a to 5c, an upper part of the back surface of the display device, in which the housing member 100 is received, may be inclined at a predetermined angle. In this instance, as shown in FIG. 5b, the supporting member 110 may be inclined by the predetermined angle.

Thirdly, as shown in FIG. 5c, the housing member 100 rises by a predetermined height by the elastic force of the first elastic member 70. For example, as shown in FIG. 5c, the housing member 100 may rise until the supporting member 110 is horizontal to the upper part of the display device. Hence, the camera module CD protrudes toward the front surface of the display device.

Further, an operation of the driving member in accordance with the fall of the housing member 100 is performed in reverse order of the above-described operation of the driving member in accordance with the rise of the housing member 100.

Firstly, as shown in FIG. 5c, when the user presses the upper part of the housing member 100 while applying a predetermined pressure to it, the housing member 100 falls in the vertically downward direction, i.e., the second direction. As shown in FIG. 5b, the supporting member 110 is inclined by an inclined angle of the upper part of the back surface of the display device due to the fall of the housing member 100.

Secondly, as shown in FIG. 5a, when the user continuously presses the upper part of the housing member 100 while applying a predetermined pressure to it, the housing member 100 continuously falls in the vertically downward direction, i.e., the second direction. Hence, because the supporting member 110 can no longer be inclined to the outside of the housing member 100, the supporting member 110 is received in the housing member 100.

Thirdly, when the user continuously presses the upper part of the housing member 100 while applying a predetermined pressure to it, the first fixing member 40 is fastened to the second fixing member 50. Hence, the housing member 100 is fixed. As a result, as shown in FIG. 5a, the housing member 100 is received in the display device.

As described above, according to the second embodiment of the invention, because the housing member 100 vertically rises and also the camera module CD received in the housing member 100 is frontward inclined by the supporting member 110, the camera CA protrudes toward the front surface of the display device. As a result, the second embodiment of the invention may be implemented, so that the display device is not included in the angle θ of view of the camera CA without increasing a protruding height of the camera module CD as shown in FIG. 5c. Thus, the second embodiment of the invention can solve the problem, in which a portion of the display device is taken by the camera, without increasing the protruding height of the camera module.

Figure 7A:
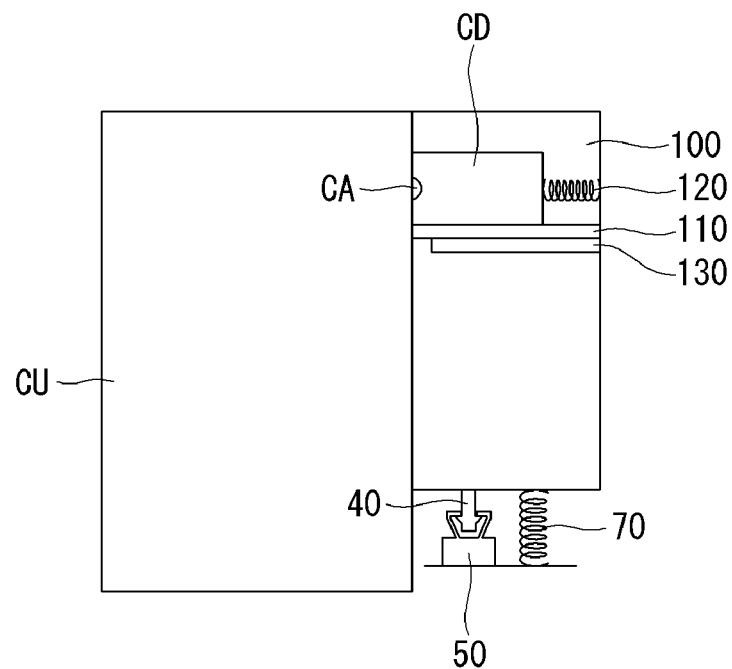
FIGS. 7a and 7b illustrate a camera module of a display device according to a third embodiment of the invention.
Figure 7B:
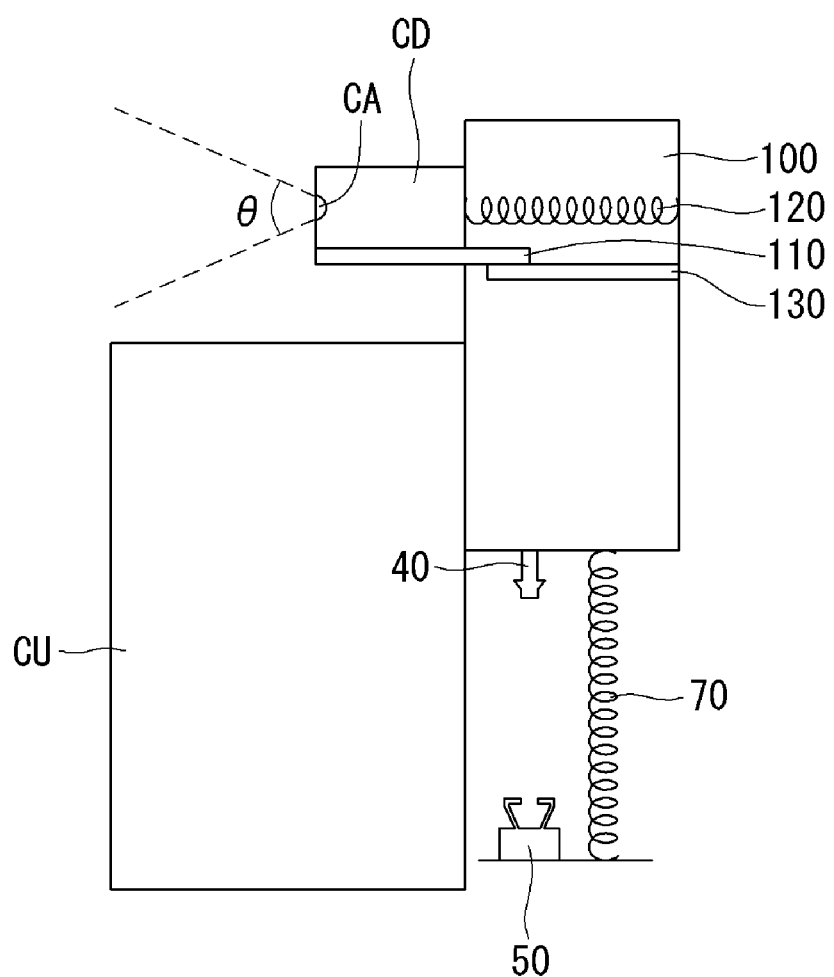

FIGS. 7a and 7b illustrate a camera module of a display device according to a third embodiment of the invention. More specifically, FIG. 7a is a side view showing an example where a housing member 100 receiving a camera module CD is received in the display device, and FIG. 7b is a side view showing an example where the housing member 100 rises in a vertical direction (y-axis direction) and protrudes, and the camera module CD protrudes toward a front surface of the display device. In FIGS. 7a and 7b, the camera module CD, a supporting member 110, a third elastic member 120, and a guide rail 130 are covered by the housing member 100.

Referring to FIGS. 7a and 7b, the display device according to the third embodiment of the invention includes a display panel (not shown), a case member CU, the camera module CD, and a driving member for driving the camera module CD.

The display panel (not shown) displays an image. The display panel 10 may be implemented as a flat panel display panel, such as a liquid crystal display (LCD) panel, a field emission display (FED) panel, a plasma display panel (PDP), and an organic light emitting diode (OLED) display panel.

The case member CU is formed to surround a front edge, an upper surface, a lower surface, a left side, a right side, and a back surface of the display panel (not shown), so as to protect the display panel (not shown) from an external impact.

The camera module CD includes a camera CA for taking an image. The camera module CD has to be disposed on the back surface of the display panel (not shown) considering a structure of the display device. Therefore, as shown in FIGS. 7a and 7b, the camera module CD is disposed on a back surface of the display device.

The driving member includes the housing member 100, the supporting member 110, first and second fixing members 40 and 50, a first elastic member 70, the third elastic member 120, and the like.

The housing member 100 has enough space to receive the camera module CD, and the camera module CD is received in the housing member 100. The first fixing member 40 and a rack (not shown) may be formed in the housing member 100. As shown in FIGS. 7a and 7b, the first fixing member 40 is formed on a lower surface of the housing member 100 and is fastened to the second fixing member 50, thereby fixing the housing member 100. The rack (not shown) is formed in the housing member 100 and may be geared to a pinion (not shown). The housing member 100 may be movably implemented in the vertical direction (y-axis direction) by a gear device including the rack (not shown) and the pinion (not shown).

Further, the housing member 100 is coupled with the first elastic member 70 and a second elastic member (not shown). The first elastic member 70 provides an elastic force in a first direction. The first direction may be a vertically upward direction rising in the vertical direction. The housing member 100 moves in the first direction by the elastic force of the first elastic member 70. The second elastic member (not shown) provides an elastic force in a second direction which is the opposite direction of the first direction. The second direction may be a vertically downward direction falling in the vertical direction. The second elastic member (not shown) prevents a sharp rise of the housing member 100 resulting from the elastic force of the first elastic member 70. Thus, the elastic force of the second elastic member (not shown) has to be smaller than the elastic force of the first elastic member 70.

The second fixing member 50 is fastened to the first fixing member 40 and fixes the housing member 100. Further, when a predetermined pressure is applied to the second fixing member 50 in the vertically downward direction, i.e., the second direction, the fastening between the first fixing member 40 and the second fixing member 50 is released.

The supporting member 110 is attached to a lower part of the camera module CD and supports the camera module CD. The supporting member 110 moves in the vertical direction (y-axis direction) along the guide rail 130 formed in the housing member 100. The third elastic member 120 is coupled with the housing member 100 and provides an elastic force for the camera module CD in the vertical direction (y-axis direction). As a result, the camera module CD is attached to the supporting member 110 and can move in the vertical direction (y-axis direction) along the guide rail 130. Also, the camera module CD receives the elastic force of the vertical direction (y-axis direction) provided by the third elastic member 120. Therefore, as shown in FIG. 7a, the camera module CD is received in the housing member 100. As shown in FIG. 7b, the camera module CD may protrude toward a front surface of the housing member 100. As a result, the third embodiment of the invention may be implemented, so that the display device is not included in an angle θ of view of the camera CA without increasing a protruding height of the camera module CD as shown in FIG. 7b. Thus, the third embodiment of the invention can solve a problem, in which a portion of the display device is taken by the camera, without increasing the protruding height of the camera module.

Hereinafter, an operation of the camera module CD in accordance with the rise of the housing member 100 is sequentially described with reference to FIGS. 7a and 7b.

Firstly, as shown in FIG. 7a, as the first fixing member 40 is fastened to the second fixing member 50, the housing member 100 is fixed. Hence, because the housing member 100 is received on the back surface of the display device, the camera module CD cannot protrude even if the camera module CD receives the elastic force of the third elastic member 120. Thus, as shown in FIG. 7a, camera module CD is received in the housing member 100.

Secondly, as shown in FIG. 7b, when the user applies a predetermined pressure to an upper part of the housing member 100, the fastening between the first fixing member 40 and the second fixing member 50 is released by the predetermined pressure. When the fastening between the first fixing member 40 and the second fixing member 50 is released, the housing member 100 rises in the vertically upward direction, i.e., the first direction by the elastic force of the first elastic member 70. When the housing member 100 rises and a portion of the camera module CD received in the housing member 100 protrudes from the upper part of the display device, the camera module CD protrudes to the front of the housing member 100 by the elastic force of the third elastic member 120.

Further, an operation of the camera module CD in accordance with the fall of the housing member 100 is performed in reverse order of the above-described operation of the camera module CD in accordance with the rise of the housing member 100.

Firstly, as the user applies a pressure to the camera module CD in the opposite direction of a direction of the elastic force of the third elastic member 120, the user causes the camera module CD to be received in the housing member 100, and at the same time presses the upper part of the housing member 100 while applying a predetermined pressure to it. In this instance, as shown in FIG. 7*b*, the housing member 100 falls in the vertically downward direction, i.e., the second direction.

Secondly, as shown in FIG. 7*a*, when the user continuously presses the upper part of the housing member 100 while applying a predetermined pressure to it, the first fixing member 40 is fastened to the second fixing member 50. Hence, the housing member 100 is fixed. As a result, as shown in FIG. 7*a*, the housing member 100 is received in the display device.

As described above, according to the third embodiment of the invention, because the housing member 100 vertically rises and also the camera module CD received in the housing member 100 frontward protrudes, the camera CA protrudes toward the front surface of the display device. As a result, the third embodiment of the invention may be implemented, so that the display device is not included in the angle θ of view of the camera CA without increasing a protruding height of the camera module CD as shown in FIG. 7*b*. Thus, the third embodiment of the invention can solve the problem, in which a portion of the display device is taken by the camera, without increasing the protruding height of the camera module.

Figure 8A:
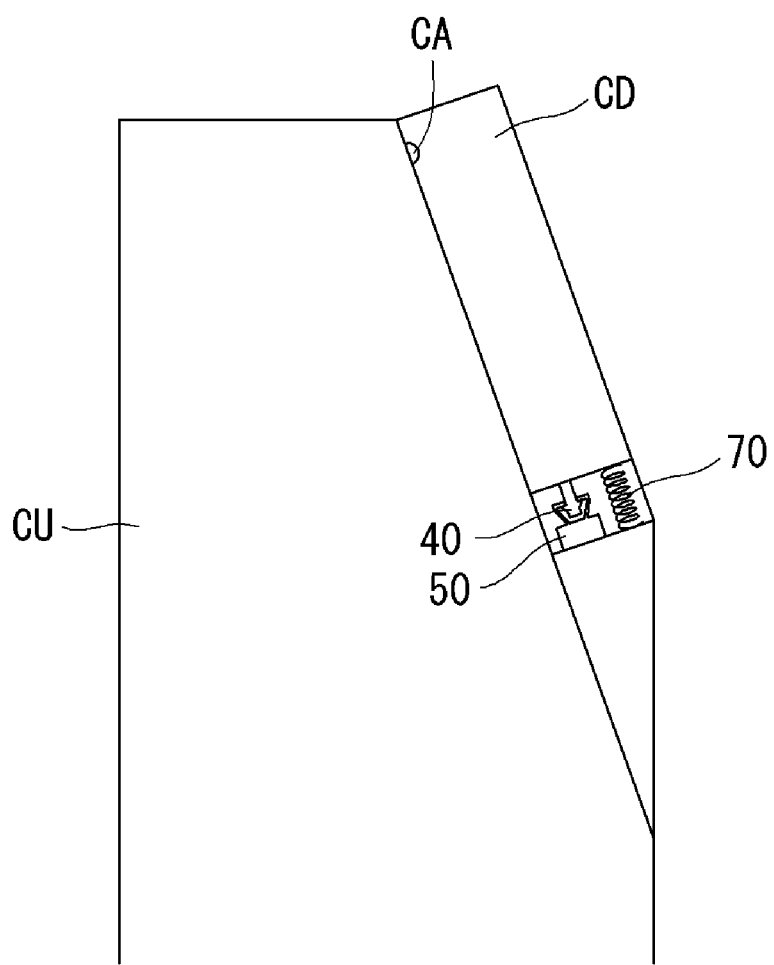
FIGS. 8a and 8b illustrate a camera module of a display device according to a fourth embodiment of the invention.
Figure 8B:
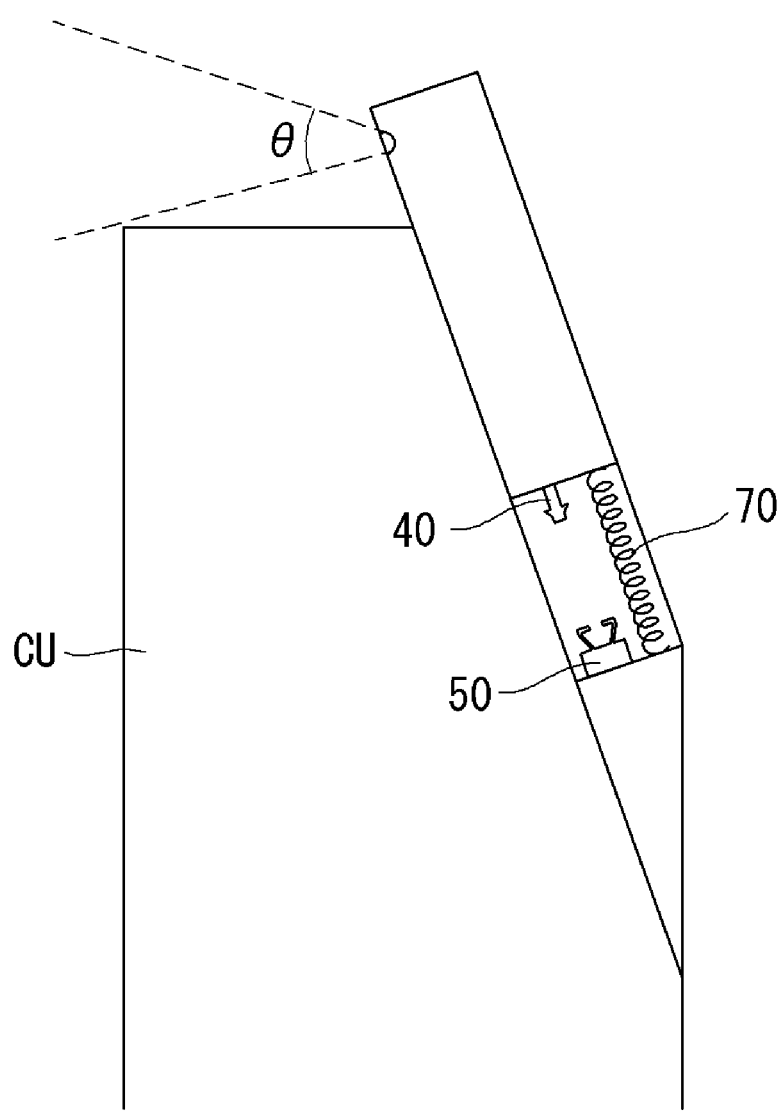

FIGS. 8*a* and 8*b* illustrate a camera module of a display device according to a fourth embodiment of the invention. More specifically, FIG. 8*a* is a side view showing an example where a housing member 100 receiving a camera module CD is received in the display device, and FIG. 8*b* is a side view showing an example where the housing member 100 rises at a predetermined angle with respect to a vertical direction (y-axis direction) and protrudes.

Referring to FIGS. 8*a* and 8*b*, the display device according to the fourth embodiment of the invention includes a display panel (not shown), a case member CU, the camera module CD, and a driving member for driving the camera module CD.

The display panel (not shown) displays an image. The display panel 10 may be implemented as a flat panel display panel, such as a liquid crystal display (LCD) panel, a field emission display (FED) panel, a plasma display panel (PDP), and an organic light emitting diode (OLED) display panel.

The case member CU is formed to surround a front edge, an upper surface, a lower surface, a left side, a right side, and a back surface of the display panel (not shown), so as to protect the display panel (not shown) from an external impact.

The camera module CD includes a camera CA for taking an image. The camera module CD has to be disposed on the back surface of the display panel (not shown) considering a structure of the display device. Therefore, as shown in FIGS. 8*a* and 8*b*, the camera module CD is disposed on a back surface of the display device.

The driving member includes a supporting member 110, first and second fixing members 40 and 50, a first elastic member 70, and the like.

The first fixing member 40 and a rack (not shown) may be formed in the camera module CD. As shown in FIGS. 8*a* and 8*b*, the first fixing member 40 is formed on a lower surface of the camera module CD and is fastened to the second fixing member 50, thereby fixing the camera module CD. The rack (not shown) is formed in the camera module CD and may be geared to a pinion (not shown). The camera module CD may be movably implemented at a predetermined angle with respect to the vertical direction (y-axis direction) by a gear device including the rack (not shown) and the pinion (not shown).

Further, the camera module CD is coupled with the first elastic member 70 and a second elastic member (not shown). The first elastic member 70 provides an elastic force in a third direction which is a direction inclined at a predetermined angle with respect to the vertical direction (y-axis direction). The camera module CD moves in a first direction by the elastic force of the first elastic member 70. The second elastic member (not shown) provides an elastic force in a fourth direction which is the opposite direction of the third direction. A second direction may be a vertically downward direction falling in the vertical direction. The second elastic member (not shown) prevents a sharp rise of the camera module CD resulting from the elastic force of the first elastic member 70. Thus, the elastic force of the second elastic member (not shown) has to be smaller than the elastic force of the first elastic member 70.

The second fixing member 50 is fastened to the first fixing member 40 and fixes the camera module CD. Further, when a predetermined pressure is applied to the second fixing member 50, the fastening between the first fixing member 40 and the second fixing member 50 is released.

An upper part of the back surface of the display device, in which the camera module CD is received, is inclined at a predetermined angle. Thus, the camera module CD is inclined at the predetermined angle and is received in the display device. Further, even when the camera module CD protrudes by the elastic force of the first elastic member 70, the camera module CD is inclined at the predetermined angle and protrudes. As a result, the fourth embodiment of the invention may be implemented, so that the display device is not included in an angle θ of view of the camera CA without increasing a protruding height of the camera module CD as shown in FIG. 8*b*. Thus, the fourth embodiment of the invention can solve a problem, in which a portion of the display device is taken by the camera, without increasing the protruding height of the camera module.

Hereinafter, an operation of the camera module CD in accordance with the rise of the camera module CD is sequentially described with reference to FIGS. 8*a* and 8*b*.

Firstly, as shown in FIG. 8*a*, as the first fixing member 40 is fastened to the second fixing member 50, the camera module CD is fixed. Hence, as shown in FIG. 8*a*, the camera module CD is received on the back surface of the display device.

Secondly, as shown in FIG. 8*b*, when the user applies a predetermined pressure to an upper part of the camera module CD, the fastening between the first fixing member 40 and the second fixing member 50 is released by the predetermined pressure. When the fastening between the first fixing member 40 and the second fixing member 50 is released, the camera module CD rises in the direction inclined at a predetermined angle with respect to the vertical direction (y-axis direction) by the elastic force of the first elastic member 70.

Further, an operation of the camera module CD in accordance with the fall of the camera module CD is performed in reverse order of the above-described operation of the camera module CD in accordance with the rise of the camera module CD.

Firstly, the user continuously presses the upper part of the camera module CD while applying a predetermined pressure to it. In this instance, as shown in FIG. 8b, the camera module CD falls in the direction inclined at a predetermined angle with respect to the vertical direction (y-axis direction).

Secondly, as shown in FIG. 8a, when the user continuously presses the upper part of the camera module CD while applying a predetermined pressure to it, the first fixing member 40 is fastened to the second fixing member 50. Hence, the camera module CD is fixed. As a result, as shown in FIG. 8a, the camera module CD is received in the display device.

As described above, according to the fourth embodiment of the invention, because the camera module CD rises in a state where the camera module CD is frontward inclined at a predetermined angle, the camera CA protrudes toward the front surface of the display device. As a result, the fourth embodiment of the invention may be implemented, so that the display device is not included in the angle θ of view of the camera CA without increasing a protruding height of the camera module CD as shown in FIG. 8b. Thus, the fourth embodiment of the invention can solve the problem, in which a portion of the display device is taken by the camera, without increasing the protruding height of the camera module.

It should be noted that the fourth embodiment of the invention may be implemented so that the camera module CD is inclined at a predetermined angle and protrudes, and at the same time the camera module CD protrudes toward the front surface of the display device as described in the first to third embodiments of the invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
 a display panel;
 a case at a rear of the display panel;
 a guide member installed in the case;
 a guide groove formed on the guide member;
 a cylindrical body including a guide projection inserted into the guide groove;
 a moving member coupled with the cylindrical body;
 a first fixing member formed on a side of the moving member;
 a first elastic member, connected to the moving member and the case, providing an elastic force for the moving member;
 a second fixing member installed at the case; and
 a camera module coupled with the cylindrical body,
 wherein the guide projection moves along the guide groove,
 wherein the guide groove includes:
 a vertical portion positioned on a lower surface of the guide member; and
 an angled portion positioned above the vertical portion and connected to the vertical portion,
 wherein the cylindrical body moves along the guide groove, and wherein the guide member has a shape corresponding to the cylindrical body, and
 wherein the first fixing member is able to fasten to the second fixing member and unfasten from the second fixing member.

2. The display device of claim 1, further comprising a second elastic member, connected to an upper portion of the moving member and the case, providing an elastic force for the moving member in an opposite direction of the elastic force of the first elastic member, wherein the first elastic member is connected to a lower portion of the moving member and the case.

3. The display device of claim 2, wherein the elastic force of the first elastic member is greater than the elastic force of the second elastic member.

4. The display device of claim 1, further comprising a hole cover located between the camera module and the moving member, coupled with the cylindrical body, and configured to cover a hole generated by a rise of the camera module.

5. The display device of claim 1, wherein the first fixing member has one of two states, including a first state in which the first fixing member is fastened to the second fixing member and a second state in which the first fixing member is unfastened from the second fixing member, wherein the state of the first fixing member is changed between the first and second states when the pressure above the predetermined pressure is applied to the second fixing member via the first fixing member.

6. The display device of claim 1, wherein the angled portion of the guide groove has a coiled shape on the guide member.

7. The display device of claim 1, wherein the guide member has a shape of a portion of a cylinder bore accommodating the guide projection.

8. The display device of claim 1, wherein the moving member has a shape of a portion of a cylinder bore accommodating a portion of the cylindrical body.

9. The display device of claim 8, wherein the cylindrical body rotates with respect to the moving member when the guide projection moves in the angled portion of the guide groove.

10. The display device of claim 8, wherein the cylindrical body is located between the guide member and the moving member.

11. The display device of claim 1, further comprising: a rack coupled with the moving member; and a pinion installed in the case, geared to the rack, wherein the pinion guides the moving member via the rack.

12. The display device of claim 11, wherein the pinion is elongated vertically.

13. The display device of claim 1, wherein the camera module is positioned above the cylindrical body and supported by the cylindrical body.

14. The display device of claim 13, wherein the cylindrical body moves vertically when the guide projection moves in the vertical portion of the guide groove, wherein the cylindrical body moves vertically and rotates azimuthally simultaneously when the guide projection moves in the angled portion of the guide groove.

* * * * *